(12) United States Patent
Ryu (10) Patent No.: US 9,790,812 B2
(45) Date of Patent: Oct. 17, 2017

(54) FLUID FILM CONICAL OR HEMISPHERICAL FLOATING RING BEARINGS

(71) Applicant: BorgWarner Inc., Auburn Hills, MI (US)

(72) Inventor: Keun Ryu, Seoul (KR)

(73) Assignee: BorgWarner Inc., Auburn Hills, MI (US)

( * ) Notice: Subject to any disclaimer, the term of this patent is extended or adjusted under 35 U.S.C. 154(b) by 9 days.

(21) Appl. No.: 14/654,604

(22) PCT Filed: Dec. 5, 2013

(86) PCT No.: PCT/US2013/073225
§ 371 (c)(1),
(2) Date: Jun. 22, 2015

(87) PCT Pub. No.: WO2014/105377
PCT Pub. Date: Jul. 3, 2014

(65) Prior Publication Data
US 2015/0315932 A1    Nov. 5, 2015

Related U.S. Application Data

(60) Provisional application No. 61/746,144, filed on Dec. 27, 2012.

(51) Int. Cl.
*F16C 17/10* (2006.01)
*F01D 25/16* (2006.01)
(Continued)

(52) U.S. Cl.
CPC ............ *F01D 25/166* (2013.01); *F16C 17/10* (2013.01); *F16C 17/18* (2013.01); *F02B 37/025* (2013.01);
(Continued)

(58) Field of Classification Search
CPC ...... F16C 17/10; F16C 17/18; F16C 2360/40; F02B 37/025; F04D 29/0513;
(Continued)

(56) References Cited

U.S. PATENT DOCUMENTS 3,811,741 A * 5/1974 McInerney ........... F01D 25/166
                                               384/291
4,392,752 A  7/1983 Shimizu et al.
(Continued)

FOREIGN PATENT DOCUMENTS

JP    63004056 A  *  8/1981   .............. F16C 17/18
JP    06307450         11/1994
(Continued)

*Primary Examiner* — Marcus Charles
(74) *Attorney, Agent, or Firm* — Young Basile Hanlon & MacFarlane, P.C.

(57) ABSTRACT

A turbocharger is provided with an improved bearing which is formed as a floating ring bearing or a semi-floating ring bearing having a conical or hemispherical shape which supports both journal and thrust loads. The floating ring bearing may have conical floating ring bearings (70), (100), (180) that define inner and outer conical bearing surfaces (71), (108), (185) and (72), (109), (186) which cooperate on the inside with corresponding conical journals (75/76), (111/112), (187/188) that rotate with the shaft (53), and cooperate on the outside with a stationary bearing housing (52) to form inner and outer fluid films. Alternatively, the floating ring bearing may have a pair of hemispherical floating ring bearings (85), (140), (210) that have hemispherical inner and outer bearing surfaces (86), (144), (211) and (87), (145), (212) which form inner and outer fluid films. A semi-floating ring bearing may also be provided with these structures.

15 Claims, 8 Drawing Sheets

(51) Int. Cl.
*F16C 17/18* (2006.01)
*F02B 37/02* (2006.01)

(52) U.S. Cl.
CPC ...... *F05D 2220/40* (2013.01); *F05D 2240/53* (2013.01); *F05D 2250/232* (2013.01); *F05D 2250/241* (2013.01); *F16C 2360/24* (2013.01)

(58) Field of Classification Search
CPC .. F04D 29/053; F04D 29/057; F05D 2220/40; F05D 2240/53; F05D 2250/232; F05D 2250/241; F01D 25/166
USPC ......... 384/99, 100, 108, 110, 129, 282, 286, 384/322; 417/407, 423.12; 415/110
See application file for complete search history.

(56) References Cited

U.S. PATENT DOCUMENTS

| | | | | |
|---|---|---|---|---|
| 4,613,288 | A | * | 9/1986 | McInerney ............. F01D 17/08 384/107 |
| 4,641,977 | A | * | 2/1987 | Woollenweber ........ F16C 21/00 384/101 |
| 5,857,332 | A | * | 1/1999 | Johnston ............... F01D 25/168 417/407 |
| 7,670,056 | B2 | * | 3/2010 | Petitjean ................. F01D 25/16 384/284 |
| 7,753,591 | B2 | * | 7/2010 | Petitjean ................. F01D 25/16 384/397 |
| 8,118,570 | B2 | | 2/2012 | Meacham et al. |
| 9,470,231 | B2 | * | 10/2016 | Diemer ................... F02B 39/10 |
| 2009/0025386 | A1 | * | 1/2009 | Rumsby ................. F02B 37/10 60/607 |
| 2009/0110572 | A1 | * | 4/2009 | Meacham ................ F02C 6/12 417/406 |
| 2010/0247343 | A1 | * | 9/2010 | Shimizu .................. F01D 25/12 417/410.1 |
| 2010/0266430 | A1 | * | 10/2010 | Shimizu .................. F02B 37/10 417/423.8 |
| 2011/0075957 | A1 | * | 3/2011 | Gutknecht ............. F01D 25/16 384/286 |
| 2011/0200422 | A1 | * | 8/2011 | Gutknecht ............. F01D 25/16 415/1 |
| 2012/0099964 | A1 | * | 4/2012 | Wang ..................... F01D 9/026 415/144 |

FOREIGN PATENT DOCUMENTS

| | | | | |
|---|---|---|---|---|
| JP | 2007046642 | A * | 2/2007 | ............. F16C 17/18 |
| JP | 2007285252 | A * | 11/2007 | ............. F02B 39/14 |
| JP | 2011140983 | | 7/2011 | |
| WO | WO-0223047 | A1 * | 3/2002 | ........... F01D 25/166 |
| WO | 2009013453 | | 1/2009 | |

* cited by examiner

FIG. 1

PRIOR ART

FIG. 2

PRIOR ART

FIG. 3

PRIOR ART

FLUID FILM CONICAL OR HEMISPHERICAL FLOATING RING BEARINGS

CROSS-REFERENCE TO RELATED APPLICATION

This application claims priority to and all benefits of U.S. Provisional Application No. 61/746,144, filed on Dec. 27, 2012, and entitled "Fluid Film Conical Or Hemispherical Floating Ring Bearings."

FIELD OF THE INVENTION

The invention relates to a turbocharger with an improved shaft bearing and more particularly, to an improved floating ring bearing in a turbocharger which bearing has a conical or hemispherical shape.

BACKGROUND OF THE INVENTION

Turbochargers are provided on an engine to deliver air to an engine intake at a greater density than would be possible in a normal aspirated configuration. This allows more fuel to be combusted, thus boosting the engine's horsepower without significantly increasing engine weight.

Generally, turbochargers use exhaust flow from an engine exhaust manifold, which exhaust flow enters a turbine housing at a turbine inlet, to thereby drive a turbine wheel, which is located in the turbine housing. The turbine wheel provides rotational power to drive a compressor wheel of the turbocharger. This compressed air is then provided to the engine intake as referenced above.

Figure 1:
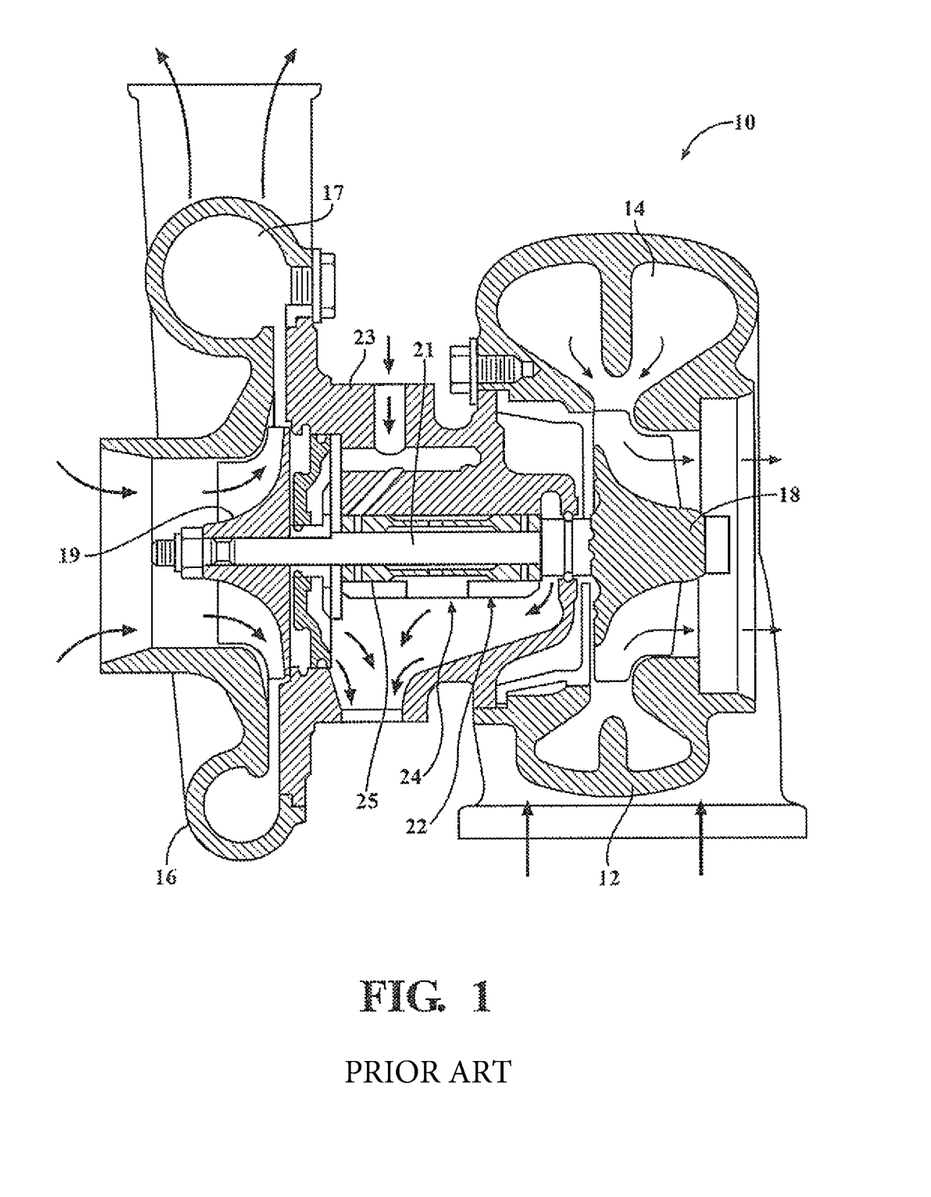
FIG. 1 is a cross-sectional view of a representative turbocharger.

Referring in more detail to a representative turbocharger 10 shown in the cross-sectional view of FIG. 1, the turbocharger 10 includes a turbine housing or casing 12 having a volute 14 extending circumferentially therein, a compressor housing 16 and a compressor volute 17, and a turbine wheel 18 and a compressor wheel 19 that are rotatably connected together by a shaft 21. The shaft 21 is supported by a bearing system 22 which is supported within a central bearing housing 23 disposed between the turbine housing 12 and the compressor housing 16. The bearing housing 23 defines a bearing chamber 24 which extends axially between the compressor housing 16 and turbine housing 12 to allow the shaft 21 to extend axially therebetween so that rotation of the turbine wheel 18 drives rotation of the compressor wheel 19 during operation of the turbocharger 10.

In this illustrated turbocharger 10, the bearing system 22 typically includes a journal bearing 25 positioned within the bearing chamber 24 to provide radial support to the rotating shaft 21. For reference purposes, the Z direction extends axially along the central axis of shaft 21, while the X and Y directions extend radially outwardly therefrom. An end view of the shaft 21 and turbocharger 10 is viewed along the Z direction while the side view is taken in the X direction. These directions are for reference and viewing purposes and are not intended to be limiting.

Figure 2:
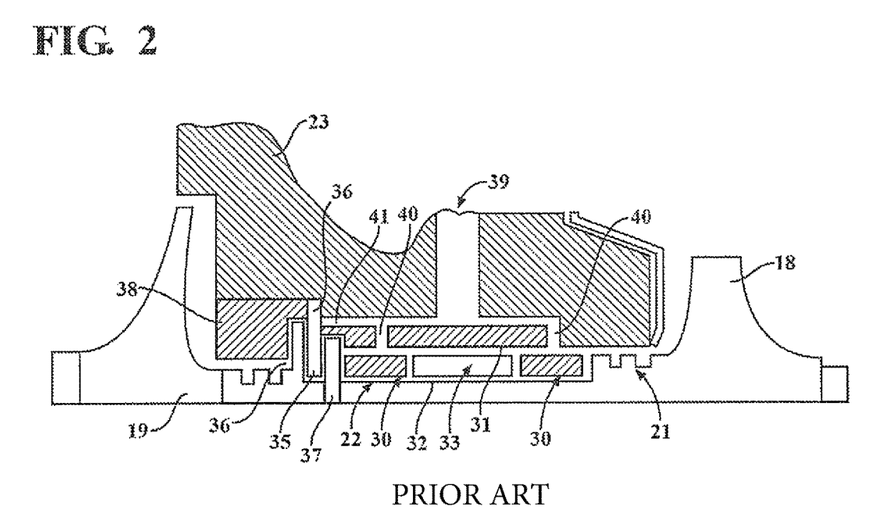
FIG. 2 is a side cross-sectional view of a turbocharger with floating ring bearings and a thrust bearing.
Figure 3:
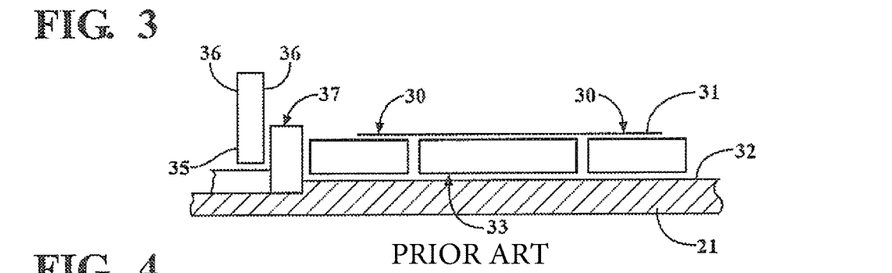
FIG. 3 is an enlarged cross-sectional side view thereof.

FIGS. 2 and 3 illustrate one example of a known bearing configuration, which is currently in commercial use. In this configuration, axially-spaced, floating ring bearings 30 are provided which are slidably received within the bearing chamber 24 and surround the shaft 21. More particularly, each floating ring bearing 30 is located radially between a radially inward-facing chamber surface 31 of the bearing housing 23 and a radially outward-facing shaft surface 32 of the shaft 21. The floating ring bearings 30 are axially separated from each other along the Z direction by a cylindrical bearing spacer 33, wherein each floating ring bearing 30 is able to float or move radially to a small extent during shaft rotation. The floating ring bearings 30 function to radially support the shaft 21 and prevent radial contact between the shaft 21 and bearing housing 23 in response to radial loads on the shaft 21.

To support axial shaft loads along the Z direction, the bearing system 22 also includes an annular thrust bearing 35 which has opposite end faces 36 which face in opposite axial directions. On one side, one end face 36 faces axially toward an opposing face of the bearing housing 23 and a thrust washer 37 which is supported on the shaft 21. The opposite end face 36 faces towards an annular insert 38 which is supported on the bearing housing 23. The thrust bearing 35 is fixed axially between the opposed faces of the insert 38, thrust washer 37 and bearing housing 23 and is thereby able to accommodate axial shaft loads.

To dampen the radial and axial movements caused by shaft rotation, a fluid such as oil is supplied to the bearing chamber 24 which oil is able to flow around the floating ring bearings 30 and the thrust bearing 35. The oil is supplied to the bearing chamber 24 through an inlet passage 39 which feeds two oil feed ports 40 that supply oil to the floating ring bearings 30 and feeds an additional oil feed port 41 that supplies oil to the thrust bearing 35.

As to the floating ring bearings 30, the oil thereby surrounds the outside and inside circumferential surfaces of the bearings 30. During shaft rotation, an inner fluid film is formed on the inside bearing surfaces which defines a journal bearing supporting the shaft 21 radially. The outside bearing surfaces also have an outer fluid film formed thereabout which provides radial support to the floating ring bearings 30. The outer and inner films form between the outer and inner bearing surfaces and the respective chamber surface 31 and shaft surface 32. As to the thrust bearing 35, fluid films also are formed between the bearing surfaces 36 and the opposed surfaces of the insert 38 and thrust washer 37 to support axial shaft loads.

Despite the foregoing, disadvantages can still exist with this known bearing configuration.

SUMMARY OF THE INVENTION

The invention relates to an improved bearing for a turbocharger wherein the inventive bearing preferably is a floating ring bearing having a conical or hemispherical shape which supports both radial and axial loads. This provides distinct advantages in reducing the part count by the elimination of a thrust bearing and its thrust washer or runner on the rotating shaft. Additionally, the inventive design reduces power loss, simplifies thermal management and provides enhanced system stability.

In one embodiment of the invention, a pair of conical floating ring bearings are provided which have a frustoconical shape to thereby define inner and outer conical bearing surfaces which cooperate on the inside with corresponding conical journals that rotate with the shaft, and cooperate on the outside with the stationary bearing housing to form inner and outer fluid films. In a second embodiment of the invention, two hemispherical floating ring bearings are provided which have arcuate inner and outer bearing surfaces which cooperate on the inside with corresponding hemispherical journals which rotate with the shaft, and cooperate on the outside with the stationary bearing housing to also form inner and outer fluid films like the conical ring bearings.

The inner and outer fluid films in both of these embodiments provide support in both axial and radial directions to accommodate the axial thrust loads and radial journal loads carried by the shaft during shaft rotation. By integrating these conical or hemispherical bearings into the floating ring bearings, this improvement significantly reduces bearing power loss and enhances the overall bearing damping capability. For example, instabilities related to a thrust bearing can be improved by the provision of the outer film in the conical or hemispherical floating ring bearings. These improved floating ring bearings also enable more compact and simple designs for the bearing housing since these improved designs eliminate the need for an oil feed port for a thrust bearing.

In further embodiments, the separate conical floating ring bearings may be joined together as a single cylinder-like unit so as to form a conical semi-floating ring bearing. One or multiple oil feed passages are provided radially through the wall of the semi-floating ring bearing to supply a flow of oil between the inner and outer fluid films. This structure could also be used to form a hemispherical semi-floating ring bearing.

If desired, the semi-floating ring bearing could be non-rotatably supported on the bearing housing, such as by an anti-rotation clip so as to form a further embodiment of a conical or hemispherical semi-floating ring bearing. In this design, the outer oil film acts as a squeeze film damper.

As will be described further herein, the inventive floating ring bearing provides advantages over known bearing configurations.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 4:
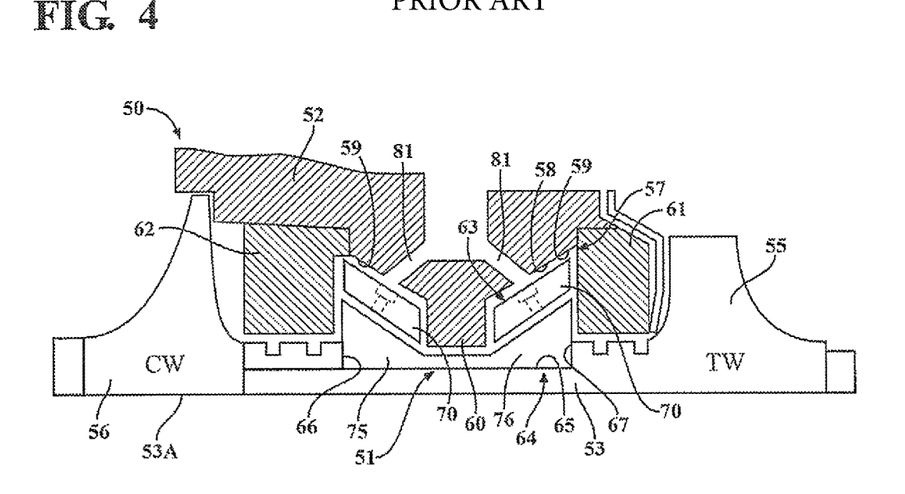
FIG. 4 is a side cross-sectional view of a turbocharger with conical floating ring bearings in a first embodiment of the invention.

Referring to FIG. 4, a turbocharger 50 includes an inventive bearing unit or assembly 51 which is located within a bearing housing 52 to provide radial and thrust load support to a shaft 53. The invention relates to various embodiments (FIGS. 4-17) of an improved bearing unit 51 for the turbocharger 50 wherein the embodiments of the inventive bearing unit 51 include conical or hemispherically shaped surfaces which support both journal and thrust loads. This provides distinct advantages in reducing the part count by the elimination of a thrust bearing as typically found in known turbochargers along with the associated thrust washer or runner on the rotating shaft. Additionally, the inventive design reduces power loss, simplifies thermal management and provides enhanced system stability.

In accord with the above description, the basic components of the turbocharger 50 (FIGS. 4 and 5) are similar to a typical turbocharger like that described above relative to FIG. 1. In this regard, the inventive turbocharger 50 (FIG. 4) generally includes a turbine wheel 55 and a compressor wheel 56 that are rotatably connected by the shaft 53.

The bearing housing 52 defines a bearing chamber 57 extending axially therethrough wherein the bearing chamber 57 opens axially towards the turbine wheel 55 and compressor wheel 56. The shaft 53 extends axially through the bearing chamber 57 so that rotation of the turbine wheel 55 rotates the shaft 53 to drive the compressor wheel 56 on the opposite end of the shaft 53. As will be described further hereinafter, the bearing unit 51 is positioned within the bearing chamber 57 to provide radial and axial support to the rotating shaft 53.

The bearing housing 52 defines a bearing chamber surface 58, which faces radially inwardly toward and surrounds the shaft 53 in radially spaced relation to define the bearing chamber 57. In the illustrated embodiment of FIG. 4, the bearing chamber surface 58 is defined by two conically inclined chamber surfaces 59 on the turbine and compressor sides of the chamber 57. The bearing housing 52 further includes an annular flange 60 which projects a short distance towards the shaft 53 to partially divide the chamber 57. The opposite ends of the bearing chamber 57 include annular inserts 61 and 62 on the turbine and compressor sides which non-rotatably seat within the bearing housing 52 in surrounding relation to the shaft 53. The inserts 61 and 62 are axially spaced apart and define an open bearing region 63 which surrounds the shaft 53 and receives the bearing unit 51 therein.

In this region, the shaft 53 defines a bearing pocket 64 which is defined by an outer shaft surface 65 and a pair of shaft side faces 66 and 67, which are axially spaced apart so as to fit the bearing unit 51 in the axial space between the shaft side faces 66 and 67.

Figure 5:
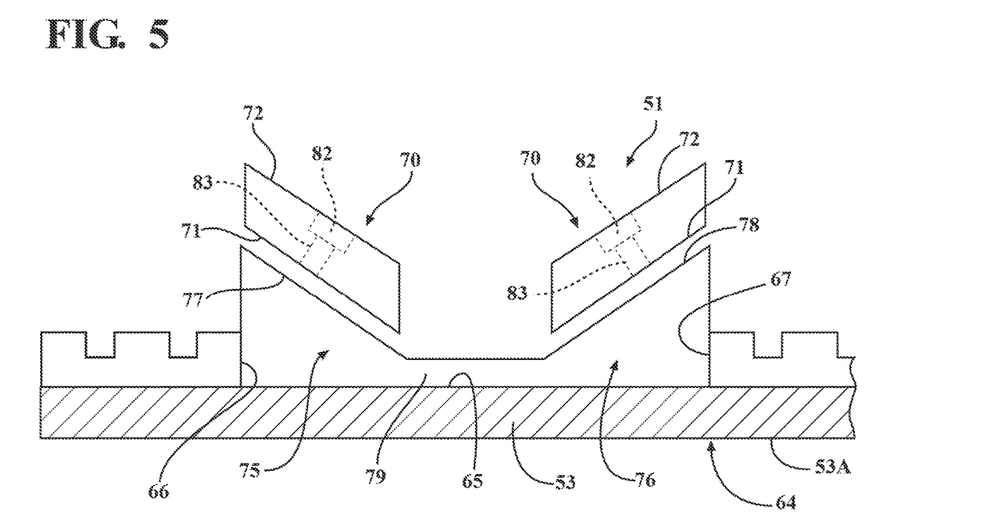
FIG. 5 is an enlarged cross-sectional side view thereof.

In the first embodiment of the invention as shown in FIGS. 4 and 5, the bearing unit 51 comprises a pair of conical floating ring bearings 70 which have a frusto-conical shape to thereby define inner and outer conical bearing surfaces 71 and 72. The conical bearings 70 float freely within the bearing region 63 and have their outer conical bearing surfaces 72 facing radially outwardly in opposing relation with the inclined chamber surfaces 59. The outer conical bearing surfaces 72 and respective inclined chamber surfaces 59 are disposed in close but slightly spaced relation to allow static and dynamic formation of an outer fluid film therebetween. The conical bearing surfaces 72 and inclined chamber surfaces 59 are oriented substantially parallel to each other at a respective inclined angle relative to a shaft axis 53A. As such, the fluid film has a film stiffness during shaft rotation which acts through a vector which is perpendicular to the surfaces 72 and 59. The vector has axial and radial components which provide support to the shaft 53 to counteract axial thrust loads acting along the shaft axis 53A and journal loads oriented radially or radiating outwardly relative to the shaft axis 53A.

The bearing unit 51 also comprises annular, first and second conical journals 75 and 76 which seat within the bearing pocket 64 defined around the shaft 53 and respectively define conical journal surfaces 77 and 78. The first conical journal 75 generally has a triangular cross section defined along conical journal surface 77 as seen in FIG. 5, while the second conical journal 76 has the same cross section defined along the conical journal surface 78 but further includes a thin-walled nose 79 which projects axially and abuts against first conical journal 75 to maintain the journal surfaces 77 and 78 in axially spaced relation. Preferably, the length of the second conical journal 76 is equal to or larger than the axial length of the first conical journal 75. The first and second conical journals 75 and 76 are press-fit on the shaft 53 so as to rotate with the shaft 53 and receive radial and axial load support from the conical floating ring bearings 70.

More particularly, the conical journal surfaces 77 and 78 face outwardly toward the inner conical bearing surfaces 71 in close but slightly spaced relation to allow formation of an inner fluid film therebetween. The conical bearing surfaces 71 and journal surfaces 77 and 78 are oriented substantially parallel to each other at a respective inclined angle relative to the shaft axis 53A. As such, the inner fluid film also has a film stiffness during shaft rotation which acts through a vector which is perpendicular to the surfaces 71, 77 and 78. The vector has axial and radial components wherein the combination of the inner and outer fluid films provide support to the shaft 53 to counteract axial thrust loads acting along the shaft axis 53A and journal loads oriented radially relative to the shaft axis 53A.

As to the fluid film, oil or any other suitable fluid is supplied to the bearing chamber 57. The oil is able to flow around the conical floating ring bearings 70 and thereby flow along the conical bearing surfaces 71 and 72 to allow formation of the inner and outer fluid films during shaft rotation. The oil is supplied to the bearing chamber 57 from an inlet passage 80 (FIG. 4) which feeds two oil feed ports 81 that supply oil to the floating ring bearings 70 through the inclined chamber surfaces 59.

The oil thereby surrounds the outside and inside circumferential surfaces of the conical ring bearings 70. During shaft rotation, the inner fluid film is formed on the inside bearing surfaces 71 adjacent the journal bearing surfaces 77 and 78. The outer bearing surfaces 72 also have the outer fluid films formed between the outer bearing surfaces 72 and the opposed housing surfaces 59. The outer and inner films form between the outer and inner bearing surfaces 72 and 71 and the respective chamber surfaces 59 and journal surfaces 77 and 78 so as to support radial and axial loads during shaft rotation.

To further assist in the distribution of the fluid about the ring bearings 70, each of the conical floating ring bearings 70 has multiple oil feeding passages. More particularly, each bearing 70 includes a circumferential oil distribution groove 82 which opens outwardly from each bearing surface 72. Each groove 82 is fed by one of the oil feed ports 81 seen in FIG. 4. The groove 82 in turn feeds a plurality of passages 83 which are circumferentially spaced apart and circulate oil from the grooves 82 to the inner conical bearing faces 71 to support formation of the inner fluid film across the conical bearing surfaces 71 and 72 of the conical ring bearings 70.

Figure 6:
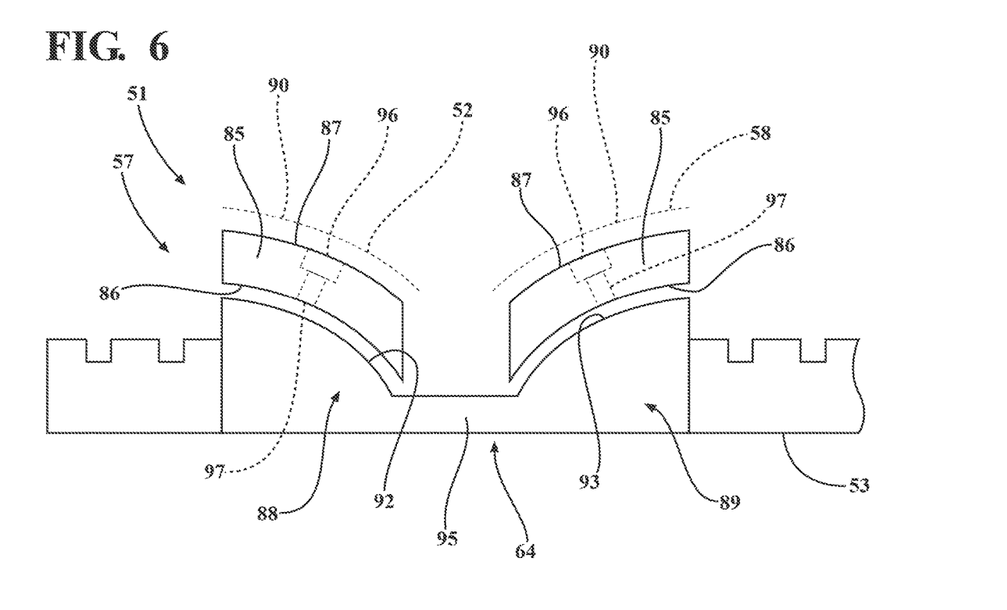
FIG. 6 is a cross-sectional side view of hemispherical floating ring bearings in a second embodiment of the invention.

In a second embodiment of the invention as seen in FIG. 6, the bearing unit 51 includes two hemispherical floating ring bearings 85 which have arcuate inner and outer bearing surfaces 86 and 87. The inner and outer bearing surfaces 86 and 87 cooperate on the inside with corresponding hemispherical journals 88 and 89 which rotate with the shaft 53, and cooperate on the outside with the stationary bearing housing 52 to form inner and outer fluid films. In this hemispherical design, the bearing chamber 57 of the bearing housing 52 is formed substantially the same as FIG. 4 except that it is modified in this second embodiment so that the bearing chamber surface 58 is modified to include two arcuate or hemispherical chamber surfaces 90 (FIG. 6) on the turbine and compressor sides of the chamber 57.

In the embodiment of FIG. 6, the hemispherical floating ring bearings 85 have a thin-walled shape which nonlinearly increases in radius along the length to thereby define the inner and outer hemispherical bearing surfaces 86 and 87. The bearings surfaces 86 and 87 are arcuate in cross-section so as to respectively have truncated concave and convex shapes which are referenced herein as hemispherical. This term shall refer to any curved surfaces suitable to the invention.

Like the conical bearings 70, the hemispherical bearings 85 float freely within the bearing chamber 57 and have their outer bearing surfaces 87 facing radially outwardly in opposing relation with the opposing chamber surfaces 90. The outer conical bearing surfaces 87 and respective chamber surfaces 90 are disposed in close but slightly spaced relation to allow static and dynamic formation of an outer fluid film therebetween. The outer fluid film has a film stiffness during shaft rotation which acts through a vector which is perpendicular to the surfaces 87, 90, wherein the vector has axial and radial components which thereby provide support to the shaft 53 to counteract axial thrust loads acting along the shaft 53 and journal loads oriented radially or radiating outwardly relative to the shaft 53.

Also, like the first embodiment of FIGS. 4 and 5, the journals 88 and 89 are located within the bearing pocket 64. These first and second hemispherical journals 88 and 89 extend around the shaft 53 and respectively define hemispherical journal surfaces 92 and 93. The journal surfaces 92 and 93 are arcuate when viewed in cross-section to form a truncated convex shape which is complementary to the opposing inner surfaces 86 of the bearings 85. The second hemispherical journal 89 has a cross section defined along the journal surface 93 which is the same as journal 88 along journal surface 92 but further includes a thin-walled nose 95 which projects axially and abuts against first journal 88 to maintain the journal surfaces 92 and 93 in axially spaced relation. The first and second hemispherical journals 88 and 89 rotate with the shaft 53 and receive radial and axial load support from the floating ring bearings 85.

More particularly, the hemispherical journal surfaces 92 and 93 face outwardly toward the inner conical bearing surfaces 86 in close but slightly spaced relation to allow formation of an inner fluid film therebetween. The inner fluid film also has a film stiffness during shaft rotation which acts through a vector which is perpendicular to the surfaces 86, 92 an 93. The vector therefore has axial and radial components wherein the combination of the inner and outer fluid films provide support to the shaft 53 to counteract axial thrust loads acting along the shaft 53 and journal loads oriented radially relative to the shaft 53.

The fluid films are formed in the same manner as FIG. 4 wherein oil or any other suitable fluid is supplied to the bearing chamber 57 which oil is able to flow around the hemispherical floating ring bearings 85 and thereby flow along the hemispherical bearing surfaces 86 and 87 to allow dynamic formation of the inner and outer fluid films during shaft rotation. Like in FIG. 4, the oil is supplied to the bearing chamber 57 through the inlet passage 80 (FIG. 4) which feeds the two oil feed ports 81 that supply oil to the floating ring bearings 85 through the inclined chamber surfaces 90.

The oil thereby surrounds the outside and inside circumferential surfaces of the hemispherical ring bearings 85 both under static and dynamic conditions. During shaft rotation, the inner fluid film is formed dynamically on the inside bearing surfaces 86 adjacent the journal bearing surfaces 92 and 93. The outer bearing surfaces 87 also have the outer fluid films formed between the outer bearing surfaces 87 and the opposed housing surfaces 90. The outer and inner films form during shaft rotation to support radial and axial loads.

Further, the hemispherical floating ring bearings 85 have multiple oil feed passages. Each bearing 85 includes a circumferential oil distribution groove 96 which opens outwardly from each hemispherical bearing surface 87. Each groove 96 is fed by one of the oil feed ports 81 seen in FIG. 4. The groove 96 in turn feeds a plurality of passages 97 which are circumferentially spaced apart and circulate oil from the grooves 96 to the inner conical bearing faces 86 to support formation of the inner fluid film across the hemispherical bearing surfaces 92 and 93 of the hemispherical journals 88 and 89.

Figure 7:
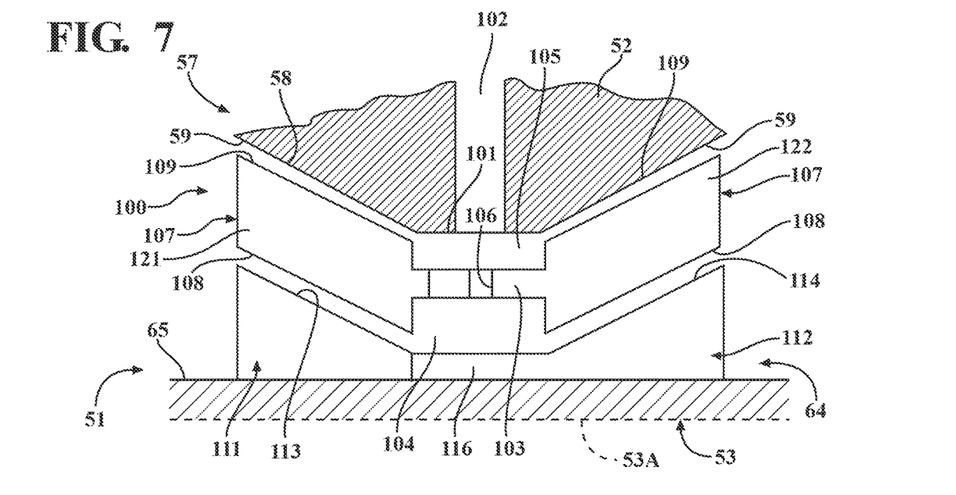
FIG. 7 is a cross-sectional side view of a third embodiment showing a conical semi-floating ring bearing according to the invention.
Figure 8:
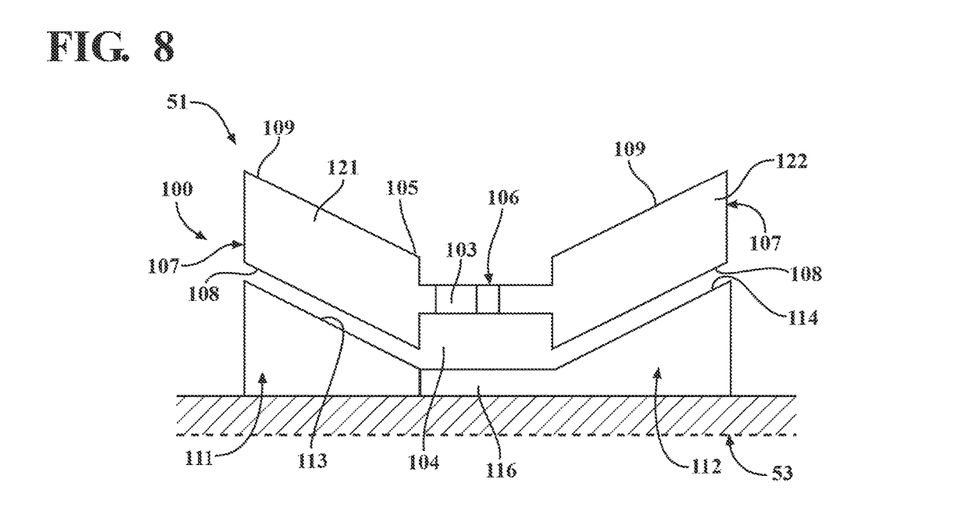
FIG. 8 is an enlarged cross-sectional side view thereof.
Figure 9:
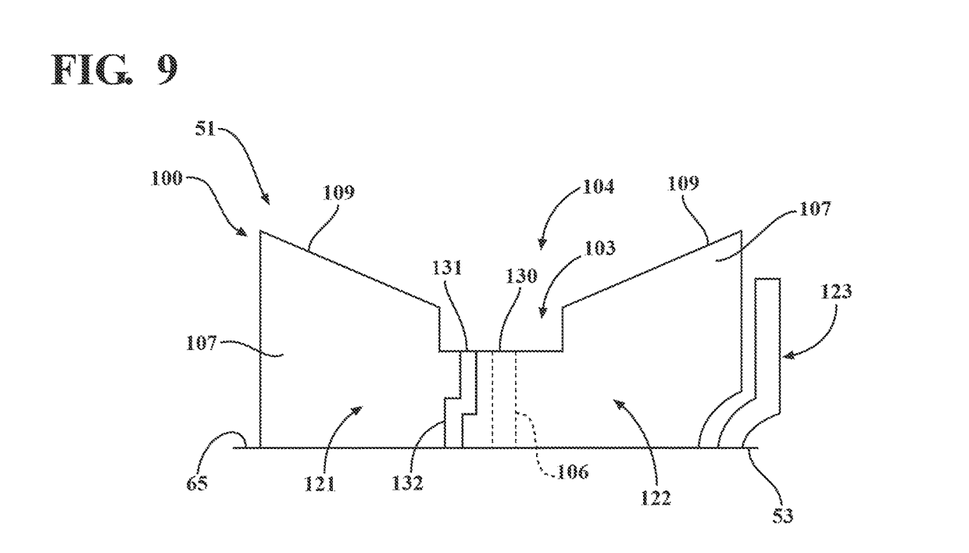
FIG. 9 is a side view of the third embodiment showing a conical semi-floating ring bearing held in a locked, non-rotative condition.

Next, FIG. 7 is a cross-sectional side view of a third embodiment of the bearing unit 51 which comprises a conical semi-floating ring bearing 100. In the third embodiment, the shaft 53 defines an opposing shaft surface 65 which faces radially outwardly in opposing relation to the chamber surface 58. This embodiment is also shown in FIGS. 8 and 9. The semi-floating ring bearing 100 is located radially between the bearing chamber surface 58 and the opposing shaft surface 65 to provide radial and axial support to the shaft 53.

Like the illustrated embodiment of FIG. 4 discussed above, the bearing chamber surface 58 (FIG. 7) is defined by two conically inclined chamber surfaces 59 on the turbine and compressor sides of the bearing chamber 57. The bearing housing 52 in FIG. 7 is modified since it does not include an annular flange 60 as in FIG. 4. Rather, an annular flat surface 101 is provided through which one or more oil feed ports 102 are provided to supply the fluid to the central area of the bearing chamber 57.

While not illustrated, it will be understood that the opposite ends of the bearing chamber 57 of FIG. 7 would include annular inserts 61 and 62 on the turbine and compressor sides. The above-discussion of these components is also applicable to the similar structure of FIGS. 7-9.

In the embodiment of FIGS. 7-9, the semi-floating ring bearing 100 is not able to rotate within the bearing chamber 57 and is able to float or move radially to a small extent during shaft rotation. More particularly, the bearing 100 includes a cylindrical bearing wall 103 which defines inner and outer cavities 104 and 105. The wall 103 includes ports 106 through which oil may flow from the outer cavity 105 to the inner cavity 104.

The opposite ends of the semi-floating ring bearing 100 include annular bearing flanges 107 which define inner and outer bearing surfaces 108 and 109. These flanges 107 are structurally and functionally similar to the separate conical floating ring bearings 70 described above.

The bearing flanges 107 have a frusto-conical shape to thereby define the inner and outer conical bearing surfaces 108 and 109. The outer conical bearing surfaces 109 face radially outwardly in opposing relation with the inclined chamber surfaces 59. The outer conical bearing surfaces 109 and respective inclined chamber surfaces 59 are disposed in close but slightly spaced relation to allow static and dynamic formation of an outer fluid film therebetween. The conical bearing surfaces 109 and inclined chamber surfaces 59 provide support to the shaft 53 to counteract axial thrust loads acting along the shaft axis 53A and journal loads oriented radially or radiating outwardly relative to the shaft axis 53A.

The bearing unit 100 also comprises annular, first and second conical journals 111 and 112 which seat within the bearing pocket 64 around the shaft 53 and respectively define conical journal surfaces 113 and 114. The first conical journal 111 generally has a triangular cross section defined along conical journal surface 113 as seen in FIG. 8, while the second conical journal 112 has the same cross section defined along the conical journal surface 114 but further includes a thin-walled nose 116 which projects axially and abuts against first conical journal 111 to axially space the journal surfaces 113 and 114 from each other.

The conical journal surfaces 113 and 114 face outwardly toward the inner conical bearing surfaces 108 in spaced relation to form the inner fluid film therebetween. The combination of the inner and outer fluid films provides support to the shaft 53 to counteract axial thrust loads and journal loads.

The oil flows through the inlet port 102 and through the passages 106 so as to surround the outside and inside circumferential bearing surfaces 108 and 109. During shaft rotation, the inner fluid films are formed on the inside bearing surfaces 108 adjacent the journal bearing surfaces 113 and 114. The outer bearing surfaces 109 also have the outer fluid films formed between the outer bearing surfaces 109 and the opposed housing surfaces 59. The outer and inner films form during shaft rotation so as to support radial and axial loads.

Next, FIG. 9 is a side view of the conical semi-floating ring bearing 100 which is held in a locked, non-rotative condition. The bearing 100 is formed as two interfitted bearing rings 121 and 122. At least one end of the bearing 100 includes an anti-rotation clip 123 which engages radially between the bearing housing 52 and the bearing 100 to prevent rotation of the semi-floating ring bearing 100 relative to the bearing housing 52 during shaft rotation. As such, the bearing 100 is circumferentially stationary during shaft rotation, although this semi-floating ring bearing 100 is able to float or move radially to a small extent during shaft rotation.

The bearing rings 121 and 122 respectively define the outer conical bearing surfaces 109 which face radially outwardly in opposing relation with the inclined chamber surfaces 59 (FIG. 7). The outer conical bearing surfaces 109 and inclined chamber surfaces 59 are disposed in close but slightly spaced relation to allow formation of an outer fluid film therebetween.

The bearing rings 121 and 122 also have the inner bearing surfaces 108 which face toward and are closely spaced from the conical journal surfaces 113 and 114 to allow the formation of the inner fluid film therebetween.

The first bearing ring 121 generally has a triangular cross section defined along conical bearing surface 109. The second conical bearing ring 122 has the same cross section defined along its conical bearing surface 109 but further includes a thin-walled nose 130 which projects axially and abuts against first conical bearing ring 121 to axially space the two bearing surfaces 109 away from each other. The terminal end 131 of the nose 130 has a stepped formation which mates with a complementary stepped formation 132 in the bearing ring 121. These complementary stepped formations when mated serve to join the bearing rings 121 and 122 together and radially align the inner bearing surfaces 108 (FIG. 8) with each other.

The nose 130 includes at least one of the radial fluid passages 106 which allows fluid to flow to the inner bearing surfaces 108. This fluid thereby dynamically forms the inner fluid film along the bearing surfaces 108 during shaft rotation. Further, the conical bearing surfaces 109 face outwardly toward the chamber surfaces 59 (FIG. 7) in spaced relation to form squeeze film dampers which provide support to the shaft 53 to counteract axial thrust loads acting along the shaft 53. The inner film also forms a journal bearing for the shaft 53.

Figure 10:
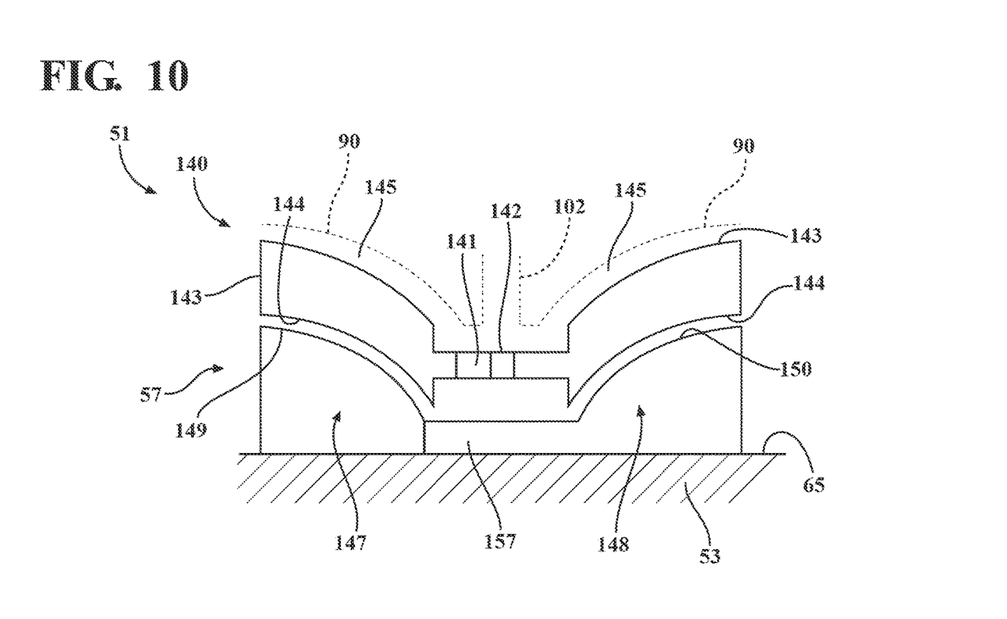
FIG. 10 is a cross-sectional side view of a fourth embodiment showing a hemispherical semi-floating ring bearing.

FIG. 10 is a cross-sectional side view of a fourth embodiment of the bearing unit 51 that comprises a hemispherical semi-floating ring bearing 140, which is constructed for seating within the bearing housing 52 similar to that described above. In the embodiment of FIG. 10, the semi-floating ring bearing 140 is formed similar to FIG. 7 except that the bearing surfaces are hemispherical instead of conical like those seen in FIG. 6. As such, the chamber surfaces 90 are hemispherical like those seen in FIG. 6, and the semi-floating ring bearing 140 is located radially between the bearing chamber surfaces 90 and the opposing shaft surface 65 to provide radial and axial support to the shaft 53. One or more oil feed ports 102 are provided to supply the fluid to the central area of the bearing chamber 57.

Figure 11:
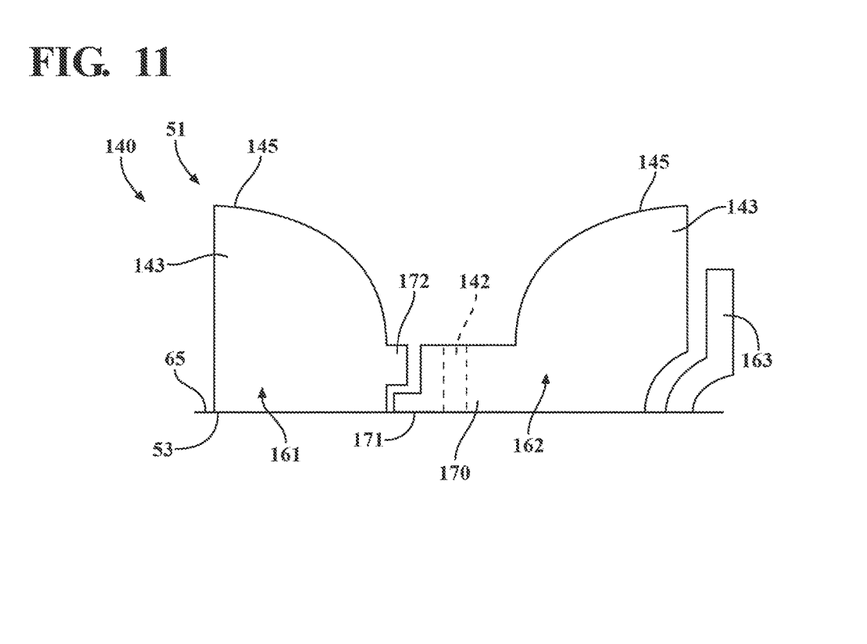
FIG. 11 is a side view of the fourth embodiment showing the hemispherical semi-floating ring bearing held in a locked, non-rotative condition.

In the embodiment of FIG. 10, the semi-floating ring bearing 140 is not able to rotate within the bearing chamber 57 and is able to float or move radially to a small extent during shaft rotation. As seen in FIGS. 10 and 11, the bearing 140 includes a cylindrical bearing wall 141 which includes at least one oil passage 142 through which oil may flow from the outside to the inside of the bearing wall 141.

The opposite ends of the semi-floating ring bearing 140 include annular bearing flanges 143 which define hemispherically shaped inner and outer bearing surfaces 144 and 145. The outer conical bearing surfaces 145 face radially outwardly in opposing relation with the chamber surfaces 90. These surfaces 90 have a hemispherical shape. The outer hemispherical bearing surfaces 145 and respective chamber surfaces 90 are disposed in close but slightly spaced relation to allow static and dynamic formation of an outer fluid film therebetween. The bearing surfaces 145 and complementary chamber surfaces 90 provide support to the shaft 53 to counteract axial thrust loads and radial journal loads.

The bearing unit 140 also comprises annular, first and second hemispherical journals 147 and 148 which respectively define hemispherical journal surfaces 149 and 150. The first journal 147 generally has a generally convexly shaped cross section defined along journal surface 149, while the second journal 148 has the same cross section defined along the journal surface 150 but further includes a thin-walled nose 157 which projects axially and abuts against the first journal 147 to maintain the journal surfaces 149 and 150 in axially spaced relation.

The hemispherical journal surfaces 149 and 150 face outwardly toward the inner bearing surfaces 144 in spaced relation to form the inner fluid film. The combination of the inner and outer fluid films provides axial and radial support to the shaft 53.

FIG. 11 is a side view of this fourth embodiment of the bearing unit 51 formed as the two-piece hemispherical semi-floating ring bearing 140 which is held in a locked, non-rotative condition.

The bearing 140 is formed as two interfitted bearing rings 161 and 162. The bearing ring 162 includes an anti-rotation clip 163 which engages radially between the bearing housing 52 and the bearing 140 to prevent rotation thereof. As such, the bearing 140 is circumferentially stationary during shaft rotation, although this semi-floating ring bearing 140 is able to float or move radially to a small extent during shaft rotation.

The bearing rings 161 and 162 have the hemispherical bearing surfaces 145 which face radially outwardly in opposing relation with the hemispherical chamber surfaces 90 (FIG. 10) and form the outer fluid film. The bearing rings 161 and 162 also have the inner bearing surfaces 144 (FIG. 10) which face toward and are closely spaced from the journal surfaces 149 and 150 to allow the formation of the inner fluid film therebetween.

The bearing rings 161 and 162 have similar cross-sectional profiles defined by the bearing surfaces 145 except that bearing ring 162 includes a thin-walled nose 170 which projects axially and abuts against first bearing ring 161 to axially space the two bearing surfaces 145 away from each other. The bearing rings 161 and 162 have complementary stepped formations 171 and 172 which mate to join the bearing rings 161 and 162 together and radially align the inner bearing surfaces 144 (FIG. 10) with each other.

The nose 170 includes at least one radial fluid passage 142 which allows fluid to flow inwardly to the inner bearing surfaces 144 (FIG. 10). This fluid thereby dynamically forms the inner fluid film along the bearing surfaces 144 during shaft rotation. Further, the hemispherical bearing surfaces 145 face outwardly toward the chamber surfaces 90 (FIG. 10) in spaced relation to form squeeze film dampers which provide support to the shaft 53 to counteract axial thrust loads acting along the shaft 53 as well as radial loads. The inner film also forms a journal bearing for the shaft 53.

Figure 12:
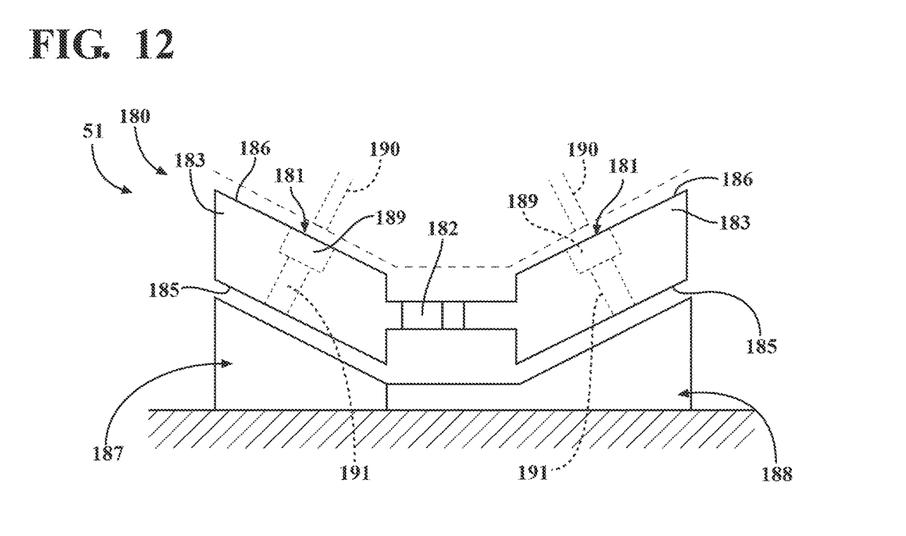
FIG. 12 is a cross-sectional side view of a fifth embodiment showing a conical semi-floating ring bearing having multiple oil feeding passages.

FIG. 12 is a cross-sectional side view of a fifth embodiment of the bearing unit 51 which includes a conical semi-floating ring bearing 180 having multiple oil feeding passages 191 extending radially therethrough. This design is substantially the same as the semi-floating ring bearing 100 of FIG. 7 except for the formation of oil passages through bearing flanges 183. Generally, it will be understood that the ring bearing 180 includes inner and outer conical bearing surfaces 185 and 186 on the bearing flanges 183 which cooperate with the bearing housing 52 and bearing journals 187 and 188.

More particularly, the bearing 180 is formed like bearing 100 but does not include the oil passage 106 in an intermediate wall 182. Rather, the semi-floating ring bearing 180 has a circumferential oil distribution groove 189 which opens outwardly from each bearing surface 186. Each groove 189 is fed by a respective oil feed port 190, which ports 190 are formed like ports 81 generally seen in FIG. 4. Each groove 189 in turn feeds a plurality of the passages 191 which are circumferentially spaced apart and circulate oil from the grooves 189 to the inner conical bearing faces 185 (FIG. 12) to support formation of the inner fluid film.

This deep circumferential groove 189 is machined in its respective bearing surface 186 and leads to lower centrifugal pressure losses through the feed passages 191 in the bearing 180 which bearing 180 is able to rotate during shaft rotation. These losses arise from fluid rotation forcing the lubricating oil out of the bearing 180. By reducing losses, this thereby renders higher inlet pressures of oil to the inner fluid film, which ensures full film formation and fluid lubrication by the inner fluid film at top rotor and shaft speed conditions.

Figure 13:
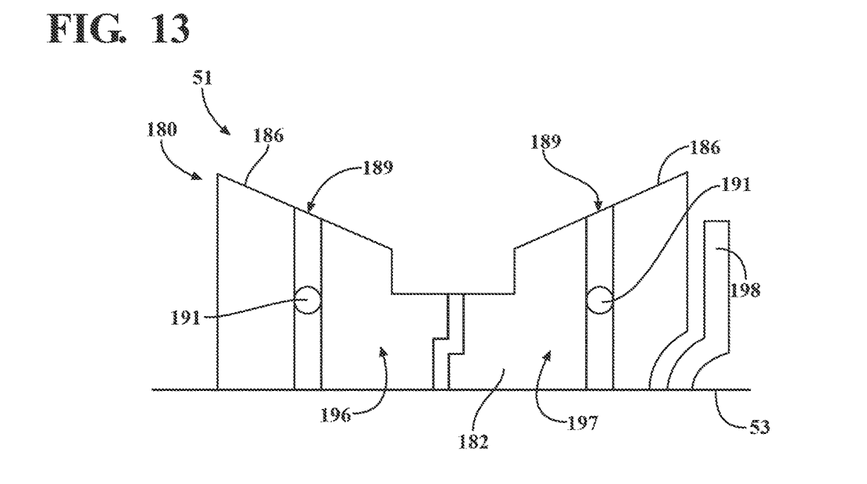
FIG. 13 is a side view of the fifth embodiment showing the conical semi-floating ring bearing being held in a locked, non-rotative condition.

FIG. 13 is a side view of the fifth embodiment of the bearing unit 51 which is formed as the conical semi-floating ring bearing 180 which is held in a locked, non-rotative condition. As seen in FIG. 13, the bearing 180 is formed as two interfitted bearing rings 196 and 197 wherein an anti-rotation clip 198 engages radially with the bearing housing 52 to prevent rotation of the semi-floating ring bearing 180 relative to the bearing housing 52 during shaft rotation.

The bearing rings 196 and 197 have the conical bearing surfaces 186 which face radially outwardly to form the outer fluid film. The bearing rings 196 and 197 also have the inner bearing surfaces 185 which face toward the bearing journals 187 and 188 to allow the formation of the inner fluid film therebetween.

To supply oil radially between the outer and inner fluid films, each of the conical bearing surfaces 186 includes the circumferential oil distribution groove 189. The groove 189 in turn feeds multiple oil passages 191 which extend radially between the conical outer bearing surfaces 186 and the inner bearing surfaces 185.

The conical bearing surfaces 186 face outwardly toward the chamber surfaces 59 (FIG. 7) in spaced relation to form squeeze film dampers which provide support to the shaft 53 to counteract radial and axial loads acting along the shaft 53. The inner film also forms a journal bearing for the shaft 53.

Figure 14:
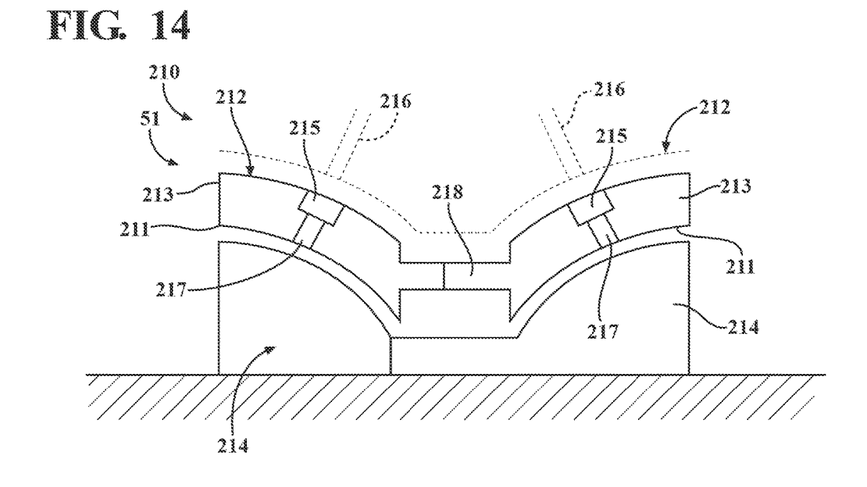
FIG. 14 is a cross-sectional side view of a sixth embodiment showing a hemispherical semi-floating ring bearing having multiple oil feeding passages.

FIG. 14 is a cross-sectional side view of a sixth embodiment of the bearing unit 51 which includes a hemispherical semi-floating ring bearing 210 having multiple oil feeding passages. This design is substantially similar to the semi-floating ring bearing 140 of FIG. 10 except for the formation of oil passages. Generally, it will be understood that the ring bearing 210 includes inner and outer hemispherical bearing surfaces 211 and 212 on bearing flanges 213. The bearing 210 also includes hemispherical journals 214 in accord with the above discussion.

The hemispherical semi-floating ring bearing 210 has a circumferential oil distribution groove 215 which opens outwardly from each bearing surface 212. Each groove 215 is fed by a respective oil feed port 216 formed like ports 81 generally seen in FIG. 4. Each groove 215 in turn feeds a plurality of radial passages 217 which are circumferentially spaced apart and circulate oil from the grooves 215 to the inner conical bearing faces 211 (FIG. 14) to support formation of the inner fluid film.

Figure 15:
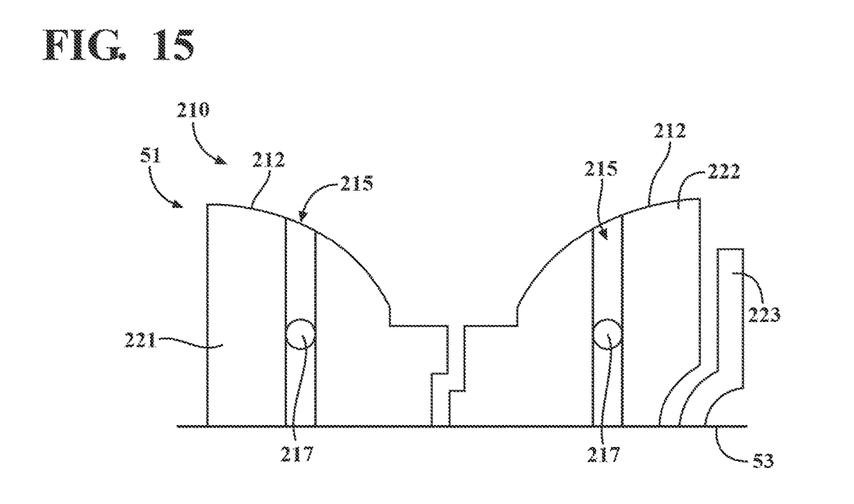
FIG. 15 is a cross-sectional side view of the sixth embodiment showing the hemispherical semi-floating ring bearing being held in a locked, non-rotative condition.

FIG. 15 is a side view of the sixth embodiment of the bearing unit 51 formed as a hemispherical semi-floating ring bearing 210 having multiple oil feed passages and being held in a locked, non-rotative condition. This design is substantially the same as the semi-floating ring bearing 180 of FIG. 13 except for the hemispherical shape of the bearing surfaces 211 and 212. Generally, the bearing 210 is formed as two interfitted bearing rings 221 and 222 wherein an anti-rotation clip 223 prevents rotation of the semi-floating ring bearing 210.

The bearing rings 221 and 222 have hemispherical bearing surfaces 212 which face radially outwardly to form the outer fluid film. The bearing rings 221 and 222 also have inner bearing surfaces 211 (FIG. 14) which face toward the journals 214 to allow the formation of the inner fluid film therebetween.

To supply oil between the outer and inner fluid films, each of the hemispherical bearing surfaces 212 includes the circumferential oil distribution groove 215. The groove 215 in turn feeds multiple oil passages 217 which extend radially between the outer bearing surfaces 212 and the inner bearing surfaces 2111 facing the journals 214.

Figures 16, 17:
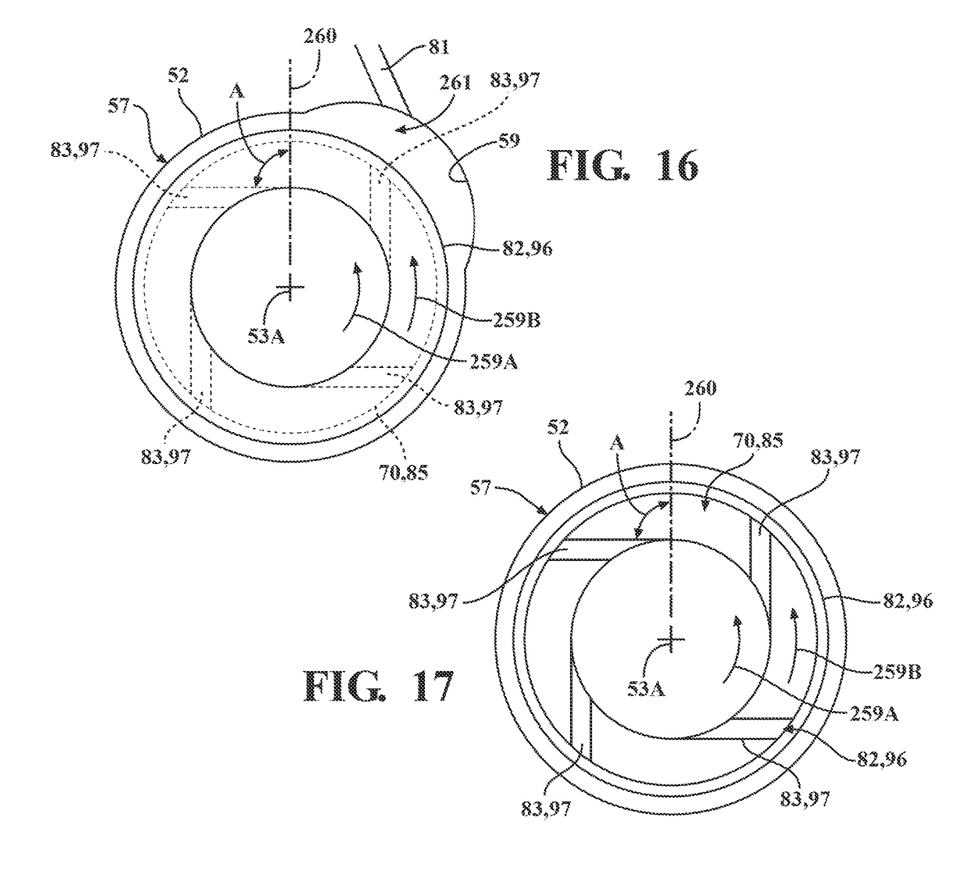
FIG. 16 is an end view of a floating ring bearing at a first axial location adjacent a housing feed port.
FIG. 17 is a cross-sectional end view of the floating ring bearing of FIG. 16 at a second axial location showing multiple feed passages in the bearing.

Next as to the feeding of oil to the bearing chamber 57, FIG. 16 is an end view of a floating ring bearing such as bearings 70 or 85 at a first axial location adjacent a housing feed port 81. FIG. 17 is a cross-sectional end view of the floating ring bearing 70/85 of FIG. 16 at a second axial location showing the feed groove 82/96 and multiple feed passages 83/97 in the bearing 70/85. FIGS. 16 and 17 are applicable to the bearings 70/85 of either of FIG. 4 or 6 and also are applicable to the various other embodiments disclosed herein. As seen in FIG. 16, the rotation direction of the shaft 53 is indicated by reference arrow 259A while the rotation direction of the floating rings 70/85 during such shaft rotation is indicated by reference arrow 259B.

The feed passages 83/97 may be angled or skewed at angle A relative to a radial direction 260 extending radially outwardly from the shaft axis 53A. Preferably, the passages 83/97 are angled against the direction of shaft rotation and against the rotation of floating ring rotation which aids to reduce the development of the circumferential speed of the fluid flow in the inner films which also aids in the reduction of the cross-coupled stiffness force coefficients. Also, as seen in FIG. 16, the feed port 81 may also be angled for the outer bearing films to provide such benefits.

As also seen in FIG. 16, the inner bearing surfaces 59 may have a portion 261 of their circumference provided with an increased radius in the area of the oil feed port 81 to define a recessed feed area which facilitates the flow of oil to the outer fluid films and thereby, to the inner fluid films.

Furthermore, it will be understood that the inner bearing surfaces of the floating bearings 70/85 may be provided with various structural formations to improve the rotordynamic performance of these bearings. For example, the inner bearing surfaces, such as surfaces 71, 86, 108, 144, 185 and 211 may be configured as: a plain circular bearing; a plain circular bearing with axial grooves; plain circular bearing with circumferential grooves; an elliptical bearing; a multiple lobe bearing such as a three or four lobe bearing; a tapered land bearing; a pressure dam bearing; a herringbone grooved bearing; a spiral groove bearing; or a flexure pivot tilting pad bearing.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A floating ring bearing unit (51) for a turbocharger shaft (53), comprising: at least one annular ring bearing (70), (85) formed as one of a floating ring bearing which comprises a plurality of inner bearing surfaces (71), (86) and outer bearing surfaces (72), (87), said inner bearing surfaces (71), (86) and outer bearing surfaces (72), (87) each having one of a conical or hemispherical shape which extends transverse to a shaft axis (53 A) of the shaft (53), said outer bearing surfaces (72), (87) facing opposing chamber surfaces (59), (90) of a bearing housing (52) in spaced relation to allow formation of an outer fluid film therebetween during rotation of the shaft (53); annular first journals (75), (88) and annular second journals (76), (89) which surround the shaft (53) and respectively define journal surfaces (77), (92) and (78), (93) which face outwardly toward said inner bearing surfaces (71), (86) in spaced relation to allow formation of an inner fluid film therebetween during shaft rotation, said journal surfaces (77), (92) and (78), (93) each having one of a conical or hemispherical shape complementary to said shape of said inner bearing surfaces (71), (86); said inner bearing surfaces (71), (86) and outer bearing surfaces (72), (87) and said journal surfaces (77), (92) and (78), (93) being oriented complementary to each other at a respective transverse angle relative to said shaft axis (53A) such that said inner and outer fluid films support axial thrust loads acting along the shaft (53) and radial loads oriented radially relative to the shaft (53).

2. The bearing unit according to claim 1, wherein a plurality of said ring bearings (70), (85) are provided in axially spaced relation and each floats freely with said outer bearing surfaces (72), (87) facing radially outwardly in opposing relation with said chamber surfaces (59), (90).

3. The bearing unit according to claim 1, wherein said ring bearing is formed as a semi-floating ring bearing (100), (140), (180), (210) having a plurality of said inner bearing surfaces (108), (144), (185), (211) and outer bearing surfaces (109), (145), (186), (212) provided in axially spaced relation and joined together by an intermediate wall (103), (141), (182), (218), said inner bearing surfaces (108), (144), (185), (211) facing inwardly toward journal surfaces (113), (114), (149), (150) of said annular journals (111/112), (147/148), (187/188) and (214).

4. The bearing unit according to claim 3, wherein said wall (103), (141) comprises a lubricant feed passage (106), (142) extending radially through said wall (103), (141) and through which fluid is flowable between said outer and inner fluid films.

5. The bearing unit according to claim 4, wherein said bearing housing (52) includes a feed port (102) feeding lubricating fluid to said feed passage (106), (142).

6. The bearing unit according to claim 3, wherein said semi-floating ring bearing (180), (210) comprises a plurality of oil feed passages (191), (217) extending radially between said inner bearing surfaces (185), (211) and said outer bearing surfaces (186), (212) and through which lubricating fluid is flowable between said outer and inner fluid films.

7. The bearing unit according to claim 6, wherein said outer bearing surfaces (186), (212) each includes an outer circumferential distribution groove (189), (215) which supplies lubricating fluid to said passages (191), (217).

8. The bearing unit according to claim 7, wherein said bearing housing (52) includes a feed port (190), (216) feeding each of said grooves (189), (215) for feeding lubricating fluid to said feed passage (191), (217).

9. The bearing unit according to claim 1, wherein an axial length of said journal surface (78), (93) on a turbine end of said bearing assembly is equal to or longer than an axial length of said journal surface (77), (92) on an opposite compressor end of said bearing unit.

10. The bearing unit according to claim 1, wherein said ring bearings (100), (140), (180), (210) have a plurality of said inner bearing surfaces (108), (144), (185), (211) and said outer bearing surfaces (109), (145), (186), (212) provided in axially spaced relation, a plurality of lubricant feed passages (191), (217) being provided which extend radially between said inner bearing surfaces (185), (211) and said outer bearing surfaces (186), (212) and through which lubricating fluid is flowable between said outer and inner fluid films, said chamber surfaces (59) having lubricant feed ports (81), (190), (216) feeding fluid to said lubricant feed passages (191), (217) and said chamber surfaces (59) having a portion (261) of their circumference provided with an increased radius adjacent said oil feed ports (81), (190), (216) to define a recessed feed area which facilitates the flow of lubricating fluid to the outer fluid films.

11. The bearing unit according to claim 1, wherein said ring bearings (100), (140), (180), (210) have a plurality of said inner bearing surfaces (108), (144), (185), (211) and said outer bearing surfaces (109), (145), (186), (212) provided in axially spaced relation, a plurality of lubricant feed passages (191), (217) being provided which extend radially between said inner bearing surfaces (185), (211) and said outer bearing surfaces (186), (212) and through which lubricating fluid is flowable between said outer and inner fluid films, said feed passages (191), (217) being skewed at an angle A relative to a radial direction (260) extending radially outwardly from said shaft axis (53A).

12. The bearing unit according to claim 11, wherein said feed passages (191), (217) are angled against the direction of shaft rotation to reduce a circumferential speed of the fluid flow in the inner films.

13. A turbocharger having a ring bearing unit (51) for a turbocharger shaft (53), comprising: at least one annular ring bearing (70), (85), (100), (140), (180), (210) formed as one of a floating ring bearing which comprises a plurality of outer bearing surfaces (72), (87), (109), (145), (186) and (212), said outer bearing surfaces (72), (87), (109), (145), (186) and (212) each having one of a conical or hemispherical shape which extends transverse to a shaft axis (53A) of the shaft (53), said outer bearing surfaces (72), (87), (109), (145), (186) and (212) facing opposing chamber surfaces (59), (90) of a turbocharger housing (52) in spaced relation to allow formation of an outer fluid film therebetween during rotation of the shaft (53); and said outer bearing surfaces (72), (87), (109), (145), (186) and (212), and said chamber surfaces (59), (90) being oriented complementary to each other at a respective transverse angle relative to said shaft axis (53A) such that said outer fluid films support axial thrust loads acting along the shaft (53) and journal loads oriented radially relative to the shaft (53).

14. The turbocharger according to claim 13, wherein said ring bearing (100), (140), (180), (210) is formed as a semi-floating ring bearing wherein said outer bearing surfaces (109), (145), (186) and (212) are defined by pairs of axially adjacent rings (121/122), (161/162), (196/197), (221/222) wherein each said ring (121/122), (161/162), (196/197), (221/222) has one of a conical or hemispherical shape.

15. The turbocharger according to claim 14, wherein each said ring (121/122), (161/162), (196/197), (221/222)

includes circumferential grooves and passages supplying lubricant to an interior of said bearing (100), (140), (180), (210).

\* \* \* \* \*